(12) United States Patent
Kuwahara

(10) Patent No.: US 8,859,461 B2
(45) Date of Patent: Oct. 14, 2014

(54) DYE MIGRATION PREVENTING DECORATION PIECES MADE OF THERMOPLASTIC SYNTHETIC RESIN

(75) Inventor: Eiji Kuwahara, Osaka (JP)

(73) Assignees: Nobuo Kuroda, Osaka-shi (JP); Eiji Kiwahara, Osaka-shi (JP)

( * ) Notice: Subject to any disclaimer, the term of this patent is extended or adjusted under 35 U.S.C. 154(b) by 0 days.

(21) Appl. No.: 13/379,859

(22) PCT Filed: Apr. 6, 2010

(86) PCT No.: PCT/JP2010/056225
§ 371 (c)(1),
(2), (4) Date: Jan. 24, 2012

(87) PCT Pub. No.: WO2011/125173
PCT Pub. Date: Oct. 13, 2011

(65) Prior Publication Data
US 2012/0121869 A1    May 17, 2012

(51) Int. Cl.
*B41M 5/50* (2006.01)
*B41M 5/52* (2006.01)
*B29C 47/04* (2006.01)
*B32B 3/00* (2006.01)
*B32B 7/10* (2006.01)

(52) U.S. Cl.
USPC ............... 503/227; 428/161; 428/212

(58) Field of Classification Search
CPC .. B41M 5/506; B41M 5/5254; B41M 5/5281; B32B 3/00; B32B 7/10; B29C 47/065
USPC ............ 503/227; 428/161, 212, 423.3, 423.5
See application file for complete search history.

(56) References Cited

U.S. PATENT DOCUMENTS

| 5,143,672 A | 9/1992 | Kuwahara |
| 6,972,139 B1 * | 12/2005 | Teegarden et al. ......... 428/32.85 |

FOREIGN PATENT DOCUMENTS

| JP | A-60-236738 | 11/1985 |
| JP | A-61-227099 | 10/1986 |
| JP | A-1-172000 | 7/1989 |
| JP | A-2-145320 | 6/1990 |
| JP | A-6-87298 | 3/1994 |
| WO | WO 2005/047360 A1 | 5/2005 |
| WO | WO 2005/054327 A1 | 6/2005 |

OTHER PUBLICATIONS

International Search Report issued in International Application No. PCT/JP2010/056225 dated Jul. 20, 2010.

* cited by examiner

*Primary Examiner* — Bruce H Hess
(74) *Attorney, Agent, or Firm* — Oliff PLC

(57) ABSTRACT

A decoration piece has: a design piece made of thermoplastic synthetic resin formed with a design and having an outer profile line; a lower layer; and a dye migration preventing layer arranged between the design piece and the lower layer, said dye migration preventing layer having an outer profile same as that of said design piece, said dye migration preventing layer capable of being adhered to both said design piece and the lower layer, said dye migration preventing layer capable of preventing any migrating of dye. The dye migration preventing layer includes a dye migration preventing film made of ethylene-vinyl alcohol copolymer or polyamide MXD6, or a dye migration preventing film made of polyvinylidene chloride.

11 Claims, 6 Drawing Sheets

DYE MIGRATION PREVENTING DECORATION PIECES MADE OF THERMOPLASTIC SYNTHETIC RESIN

TECHNICAL FIELD

The present invention relates to a decoration piece such as an emblem, a badge, an appliqué, a sticker or the like, that is to be attached to a clothing or the like, and more particularly, to such a decoration piece to which dye of the clothing or the like is not migrated when the decoration piece is attached to the clothing made of polyester fabric dyed by using dispersing dye or a sublimation printing.

BACKGROUND ART

In the patent documents Nos. 1, 2 and 3 mentioned below, for example, there are disclosed a conventional method of preparing a decoration piece such as an emblem, a badge, an appliqué, a sticker or the like, using a film of thermoplastic synthetic resin as an original material by means of a high frequency dielectric heating, and a decoration piece prepared according to the method.

When a decoration piece comprising a design or pattern piece $3p$ made of thermoplastic synthetic resin film $131q$ and a lower layer $7p$ made of a lower layer material $171q$ is prepared by a high frequency dielectric heating, as disclosed in the patent document No. 1, a mold table $101p$ is used as one of high frequency dielectric heating electrodes, and an engraving dye $103p$ is used as the other of the electrodes (see FIG. 19).

Said engraving dye $103p$ includes a fusion cutter member $105p$ and a pressing blade $107p$. The fusion cutter $105p$ includes a sharp blade edge positioned along an outer profile line of a design to be formed, and melts and cuts the thermoplastic synthetic resin film $131q$ that is material of the design piece. Where the lower layer is made of a thermal adhesion film, the lower layer is also melted and cut by the fusion cutter $105p$. The pressing blade $107p$ is provided with a pushing blade edge positioned on a plane above the sharp blade edge, and forms a design on the thermoplastic synthetic resin film $131q$. The pushing blade edge of the pressing blade $107p$ has a sharpness lower than that of the blade edge of the fusion cutter $105p$.

Base material of the decoration piece includes the lower layer material $171q$ and the thermoplastic synthetic resin film $131q$ that is a material of the design piece. As the lower layer, it is possible to use any of a cloth, knitting, a synthetic leather or the like. Where the decoration piece is a thermally transferred decoration piece, the thermal adhesion film is used as the lower layer.

Upon the preparing of the decoration piece, the lower layer material $171q$ is arranged on the mold table $101p$. The thermoplastic synthetic resin film $131q$ is arranged on the lower layer material $171q$. The film $131q$ and the material $171q$ are forced from the above, and high-frequency dielectric heated by the engraving dye $103p$. The engraving dye $103p$ forms the design on the film $131q$ by the pressing blade $107p$, to form the design piece $3p$. The fusion cutter $105p$ melts and cuts the film $131q$, to form an outer profile line of design piece $3p$.

By the high frequency dielectric heating, also, the film $131q$ is melted, and fusion-bonded to the lower layer $7p$, to form the decoration piece in which the film $131q$ is integrated to the lower layer $7p$ (FIG. 20). Then, useless portions are removed to obtain a completed decoration piece (FIG. 21). In the prior arts disclosed in the patent documents Nos. 1, 2 and 3, there is disclosed the decoration piece comprising the design piece $3p$ and the lower layer $7p$, as shown in FIG. 21.

If the decoration piece to be prepared is a decoration piece of a thermal adhesion film type (in which the lower layer is made of thermal adhesive material, and the decoration piece may be thermally adhered to an object such as the clothing, by means of an iron or the like), a releasing paper may be applied to a lower surface of the formed lower layer $7p$. Also, a transparent carrier film may be applied to an upper surface of the design piece $3p$. Although the lower layer material $171q$ is melted and cut by means of the high frequency dielectric heating in the method illustrated in FIGS. 19 and 20, it may be unnecessary to melt and cut the lower layer if the lower layer is the cloth or the like.

Patent Document No. 1: JP-A-H02-145320
Patent Document No. 2: JP-A-S61-227099
Patent Document No. 3: JP-A-H06-087298

DISCLOSURE OF THE INVENTION

Problem to be Solved by the Invention

Recently, there have been increased cloths that are made of polyester fabric dyed by using dispersing dye or a sublimation printing. A conventional decoration piece made of thermoplastic synthetic resin has a disadvantage that the decoration piece has become discoloring due to the migration of dye by a sublimation phenomenon with time after the decoration piece is applied to the polyester fabric. Similar problem is founded in objects to be putted on using a sublimation dye other than clothing.

Even if the migration of dye can be avoided, it is necessary to prevent the members for forming the decoration piece from being separated or being displaced (the lower layer and the design being separated or displaced). That is, it is required to tightly fusion-bond the design piece with a member for preventing the migration of the dye.

Where the decoration piece is prepared by using the high-frequency dielectric heating, it is also required that the material can be fusion-bonded and cut.

It is an object of the present invention to provide a decoration piece in which the dye in the clothing or object to be putted on is prevented from being migrated to the piece. Further, another object of the present invention is to provide a decoration piece in which the constituent members are not separated each other, and which piece can be prepared by high-frequency dielectric heating.

Means for Solving the Problem

In order to solve the above mentioned problem, according to the invention, there is provided a decoration piece comprising: a design piece (3) made of thermoplastic synthetic resin formed with a design and having an outer profile line; a lower layer (7); and a dye migration preventing layer (5) arranged between the design piece (3) and the lower layer (7), said dye migration preventing layer (5) having an outer profile same as that of said design piece (3), said dye migration preventing layer (5) capable of being adhered to both said design piece (3) and the lower layer (7), said dye migration preventing layer (5) capable of preventing any migrating of dye.

Preferably, said design piece (3) may be made of soft polyurethane, and said dye migration preventing layer (5) may be a laminated film comprising: a dye migration preventing film (51) made of ethylene-vinyl alcohol copolymer or polyamide MXD6: a first intermediate layer (41) co-extruded with the dye migration preventing film (51), said first intermediate layer (41) being arranged between said dye migration preventing film (51) and said design piece (3), said first intermediate layer (41) capable of fusion-bonded to said design piece (3): and a second intermediate layer (61) co-extruded with the dye migration preventing film (51), said second intermediate layer (61) being arranged between said dye migration preventing film (51) and said lower layer (7), said second intermediate layer (61) capable of fusion-bonded to said lower layer (7).

Preferably, said design piece (3) may be made of soft polyurethane. Said dye migration preventing layer 5 may comprise a dye migration preventing film (51) made of ethylene-vinyl alcohol copolymer or polyamide MXD6: a first intermediate layer (41) adhered to the dye migration preventing film (51) by a first adhesive (43), said first intermediate layer (41) being arranged between said dye migration preventing film (51) and said design piece (3), said first intermediate layer (41) capable of fusion-bonded to said design piece (3): and a second intermediate layer (61) adhered to the dye migration preventing film (51) by a second adhesive (63), said second intermediate layer (61) being arranged between said dye migration preventing film (51) and said lower layer (7), said second intermediate layer (61) capable of being fusion-bonded to said lower layer (7).

More preferably, said first intermediate layer (41) may be made of soft polyurethane film, and said second intermediate layer (61) may be made of soft polyurethane film. Further, one of said first and second intermediate layers (41, 61) may be made of soft polyurethane film, and the other film may be made of urethane thermal adhesion film.

More preferably, a metal vapor deposition layer (45 or 47) may be arranged on one of an upper and lower surfaces of said dye migration preventing film (51). On an upper surface of said first intermediate layer (41) may be laminated a metal vapor deposition layer of soft polyurethane metal vapor deposition film (81) by using a third adhesive (83).

Preferably, said design piece (3) may be made of soft polyurethane, and said dye migration preventing layer (5) may comprise a dye migration preventing film (151) made of polyvinylidene chloride.

More preferably, said dye migration preventing layer (5) may comprise said dye migration preventing film (151), and a third intermediate layer (141) disposed between said dye migration preventing film (151) and said design piece (3), said third intermediate layer (141) capable of being fusion-bonded to both said dye migration preventing film (151) and said design piece (3). Alternatively, said dye migration preventing layer (5) may comprise said dye migration preventing film (151), and a fourth intermediate layer (161) arranged between said dye migration preventing film (151) and said lower layer (7), said fourth intermediate layer (161) capable of being fusion-bonded to both of said dye migration preventing film (151) and said lower layer (7). Alternatively, said dye migration preventing layer (5) may comprise said dye migration preventing film (151): a third intermediate layer (141) arranged between said dye migration preventing film (151) and said design piece (3), said third intermediate layer (141) capable of being fusion-bonded to both said dye migration preventing film (151) and said design piece (3): and a fourth intermediate layer (161) arranged between said dye migration preventing film (151) and said lower layer (7), said fourth intermediate layer (161) capable of being fusion-bonded to both of said dye migration preventing film (151) and said lower layer (7).

Said third intermediate layer (141) and/or said fourth intermediate layer (161) may be made of urethane thermal adhesion film.

Advantages of Invention

According to the invention, since the dye migration preventing layer capable of preventing any migrating of dye is provided between the design piece made of thermoplastic synthetic resin and the lower layer, it is possible to provide a decoration piece in which a dye of the cloths or objects to be worn is not migrated to the design piece and thus a beautiful color can be maintained even if time being passed.

According to the invention, since the dye migration preventing film made of ethylene-vinyl alcohol copolymer or polyamide MXD6 is provided, any migration of the dye that is contained in cloths or object to be worn can be effectively prevented. Moreover, since the dye migration preventing film is made of ethylene-vinyl alcohol copolymer or polyamide MXD6, the film can be melted and cut by using high-frequency dielectric heating. Furthermore, since the design piece is made of soft polyurethane, and since the dye migration preventing layer is made of ethylene-vinyl alcohol copolymer or polyamide MXD6, there can be provided a decoration piece in which no harmful substance is contained so as not to bring environmental pollution.

Since the dye migration preventing film is co-extruded with the first intermediate layer and the second intermediate layer to form the laminated dye migration preventing layer, these are not separated. Since the dye migration preventing layer is fusion-bonded to the design piece and the lower layer by the first intermediate layer and the second intermediate layer, there can be provided a decoration piece having a strength increased.

According to the invention, since the dye migration preventing film made of ethylene-vinyl alcohol copolymer or polyamide MXD6 is provided, any migration of the dye that is contained in cloths or object to be worn can be effectively prevented. Also, since the dye migration preventing film is made of ethylene-vinyl alcohol copolymer or polyamide MXD6, the film can be melted and cut by using high-frequency dielectric heating. Furthermore, since the design piece is made of soft polyurethane, and since the dye migration preventing layer is made of ethylene-vinyl alcohol copolymer or polyamide MXD6, there can be provided a decoration piece containing no harmful substance, so as to bring no environmental pollution.

Since the dye migration preventing film is adhered to the first intermediate layer with the first adhesive and since the dye migration preventing film is adhered to the second intermediate layer with the second adhesive, these elements are not separated and thus a decoration piece having an increased strength can be provided.

According to the invention, since the first intermediate layer and said second intermediate layer are made of soft polyurethane film that can be fusion-bonded to the design piece and the lower layer, a decoration piece having an increased strength can be provided.

According to the invention, since one of the first and second intermediate layers is made of soft polyurethane film that can be fusion-bonded to the design piece and the lower layer, and since the other film is made of urethane thermal adhesion film that can be fusion-bonded to the design piece and the lower layer, a decoration piece having an increased strength can be provided.

According to the invention, since a metal layer is provided or arranged within the dye migration preventing layer, the function for preventing the dye migration is further increased.

According to the invention, since the provision of the dye transfer preventing film made of polyvinylidene chloride is provided or arranged, the migration of the dye that is contained in the cloths or objects to be worn can be effectively prevented. Since the dye migration preventing film is made of polyvinylidene chloride, the dye migration preventing layer is fusion-bonded to the design piece and the lower layer by high-frequency dielectric heating, and the dye migration preventing film can be melt and cut, so as to easily prepare the decoration piece by high-frequency dielectric heating. Furthermore, it is possible to simplify the construction of the dye migration preventing layer, so as to provide a lower cost decoration piece.

According to the invention, it is possible to very firmly fusion-bond the dye migration preventing layer and the design piece, so as to provide a decoration piece having an increased strength.

According to the invention, it is possible to very firmly fusion-bond the dye migration preventing layer and the lower layer, so as to provide a decoration piece having an increased strength.

According to the invention, it is possible to very firmly fusion-bond the dye migration preventing layer with the design piece and the lower layer, so as to provide a decoration piece having an increased strength entirely even.

According to the invention, since urethane thermal adhesion film which firmly fusion-bonded is used for one or both of the first and second intermediate layers, there is provided a decoration piece having an increased strength.

BEST MODE FOR CARRYING OUT THE INVENTION

Figure 1:
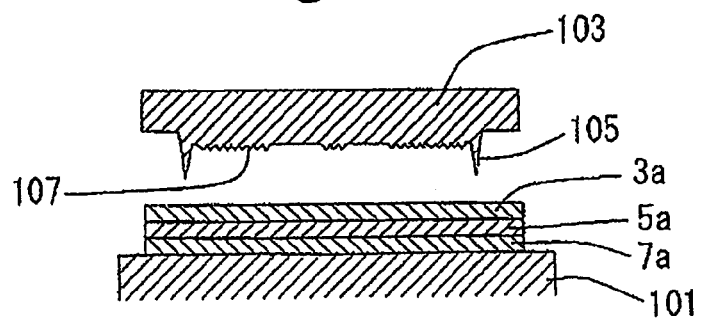
FIG. 1 is a schematic sectional view illustrating the process of the first method for preparing a decoration piece according to the invention, in which respective elements of material are disposed on a mold table.

The wordings "a front side" and "a back side" of a decoration piece designate "an upper" and "a bottom or lower", respectively, herein.

As illustrated in FIGS. 3-4, 8-12 and 14, a decoration piece 1 according to the present invention comprises a design piece 3, a dye migration preventing layer 5 arranged on a lower surface of the design piece 3, and a lower layer 7 arranged on a lower surface of the dye migration preventing layer 5. FIGS. 13, 15-18 show only the dye migration preventing layer 5, but not the design piece 3 and the lower layer 7.

The present invention has a feature that the dye migration preventing layer 5 is provided between the design piece 3 and the lower layer 7. The design piece 3 can be provided with a design or a pattern in accordance with a known art. The lower layer may use a polyester cloth as a substrate. In that case the decoration piece becomes an emblem or the like (FIGS. 7, 10-12). Where the decoration piece is a heat transferred decoration piece, the lower layer 7 is made of a thermal adhesion film, and a release paper is provided on a lower surface of the thermal adhesion film. A transparent carrier film 33 may be tackily bonded to an upper surface of the design piece 3 (FIGS. 4, 8, 9 and 14).

<Design Piece 3>

The design piece 3 can be made of a film or sheet material of thermoplastic synthetic resin that is known to be moldable by means of a high-frequency dielectric heating. For example, typically a soft polyurethane film may present.

"Soft polyurethane film" herein includes a conventional laminated film that comprises an upper layer of transparent soft polyurethane, an intermediate layer that is a first metal deposition layer, and a lower layer of soft polyurethane. If the upper layer is transparent and the first metal deposition layer is included, there can be provided a metallic decoration piece such as a golden lace or the like.

More particularly, a soft polyurethane film or sheet having a thickness of about 0.14-0.5 mm is used, but the present invention is not limited to said thickness. In the present invention it is possible to use a design piece that may be molded by the high-frequency dielectric heating and conventionally used as a design layer. As mentioned above, when being prepared a metallic decoration piece, there may be used a laminated film in which the metal deposition layer is provided on a back or rear surface of the transparent soft polyurethane film, and a further soft polyurethane film is adhered to the lower surface thereof with an adhesive.

A design or pattern may be printed on a surface of the design piece 3 in accordance with a known art, or the design piece 3 may be formed with a three-dimensional design or pattern by a conventional high-frequency dielectric heating technique. Each of the design pieces in the decoration pieces illustrated in FIGS. 3-4, 8-12 and 14 is formed with protrusions and indentations by means of a pressing blade, but such protrusions and indentations are not essential for the decoration pieces.

Figure 4:
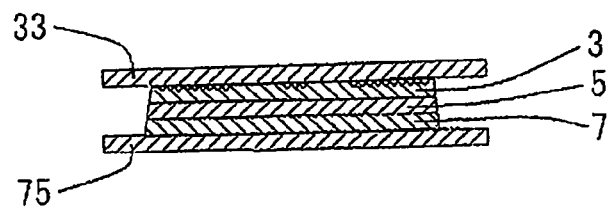
FIG. 4 is a schematic sectional view illustrating the process of the first method for preparing a decoration piece according to the invention, in which a carrier film and a release paper are mounted.
Figure 9:
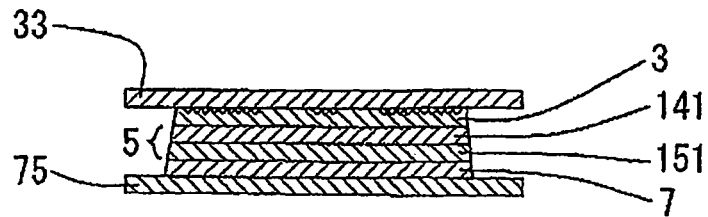
FIG. 9 is a schematic sectional view illustrating a decoration piece according to another embodiment of the invention, in which a carrier film and a release paper are mounted.
Figure 10:
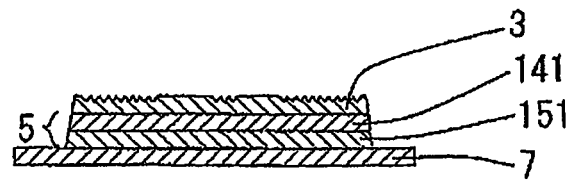
FIG. 10 is a schematic sectional view illustrating a decoration piece according to a further embodiment of the invention, in which a lower layer comprises a cloth.
Figure 14:
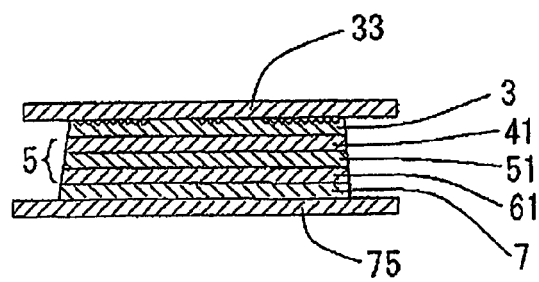
FIG. 14 is a schematic sectional view illustrating a decoration piece according to a further embodiment of the invention.
Figure 15:
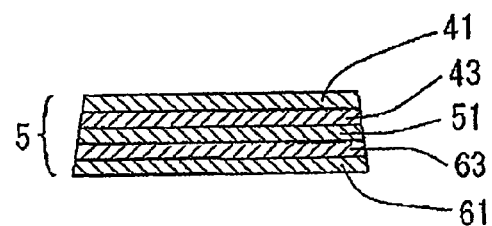
FIG. 15 is a schematic sectional view illustrating a dye migration preventing layer in a decoration piece according to a further embodiment of the invention.

A transparent carrier film 33 may be provided on the upper surface of the design piece 3 if necessary (see FIGS. 4, 9 and 14). As mentioned above, where the decoration piece according to present invention is provided as a heat transfer type, the carrier film 33 may be generally provided.

Where design or pattern portions are not integrally formed, and the relative positions therebetween become important (for example, where the designs comprise a plurality of characters such as the alphabet) the relative positions of the designs may be retained by the carrier film 3.

This carrier film 33 may be attached to the upper surface of the design piece material with a conventional tacky material, and the design piece 3 may be formed by the high-frequency dielectric heating. The carrier film 33 has a melting point that is higher than that of thermoplastic synthetic resin by which the design piece 3 is made, and thus the carrier film 33 is not melted and cut, but only the design piece is melted and cut. Also, after molding with a conventional technique, the carrier film 33 may be tackily bonded to the upper surface of the design piece 3 by using a conventional tacky material.

<Lower Layer 7>

The lower layer 7 may be various known ones in response to the application of the decoration piece 1.

For example, as disclosed in said patent documents 2 (JP-A-S61-227099) and 3 (JP-A-H06-087298), if the decoration piece 1 is to be used as the heat transfer decoration piece, a thermal adhesion film is used for the lower layer 7.

A known release paper 75 is provided on the lower surface of the heat adhesion film (FIGS. 4, 9, 14). The heat adhesion film can be protected from any contamination and adhesion by means of the release paper 75 until the decoration piece is thermally adhered in case of use (for example, the decoration piece is thermally adhered to the clothes by a heat transfer means or an iron).

As disclosed in the patent document 1 (JP-A-H02-145320), if the decoration piece 1 is to be used for a three dimensional decoration piece such as an emblem, a sticker or the like, polyester cloth may be used for the lower layer 7 (FIGS. 7, 10-12).

<Dye Migration Preventing Layer 5>

In the present invention, the dye migration preventing layer 5 is provided on the lower surface of the design piece 3.

The dye migration preventing layer 5 is required to have (a) a function for preventing the dye contained in the clothes to which the decoration piece of the present invention is mounted from being migrated to the decoration piece. The dye migration preventing layer 5 is made of material having such a function. Specifically, the material having such a function may include polyvinylidene chloride film (PVDC), ethylene-vinyl alcohol copolymer (EVOH), and polyamide MXD6. Film or sheet of these materials may be used for the dye migration preventing layer 5.

In view of an environmental pollution, EVOH or polyamide MXD6 may be preferably used.

For the PVDC film, there is "Krehalon" (trade name) manufactured by Kureha Corporation, for example. For the EVOH film, there is "Eval" (trade name) manufactured by Kuraray Co., Ltd, for example. For the polyamide MXD film, there is "Nylon MXD6" (trade name) by Mitsubishi Gas Chemical Co., Inc., for example.

When the decoration piece is to be prepared by means of the high-frequency dielectric heating, the dye migration preventing layer 5 is required to have (b) a function that the layer 5 can be melted and cut by the high-frequency dielectric heating. Films or sheets of polyvinylidene chloride film (PVDC), ethylene-vinyl alcohol copolymer (EVOH), and polyamide MXD6 can be melted and cut by the high-frequency dielectric heating.

When the decoration piece is to be prepared by means of the high-frequency dielectric heating, the dye migration preventing layer 5 is required to have (c) a function for fusion-bonding the layer 5 to the design piece 3 and fusion-bonding the layer 5 to the lower layer 7. Since the layer 5 can be fusion-bonded to the design piece 3 and the lower layer 7, it is possible to provide a decoration piece that the design piece 3 and the layers 5 and 7 are integrally constructed.

<Where PVDC is Used>

When the decoration piece is prepared by means of the high-frequency dielectric heating, the above mentioned three requirements (a), (b) and (c) are necessary.

Since PVDC satisfies all of the three requirements, PVDC film can be directly used for the dye migration preventing layer 5.

Figure 8:
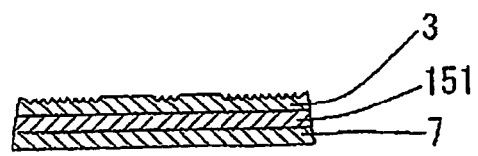
FIG. 8 is a schematic sectional view illustrating a decoration piece according to an embodiment of the invention.

That is, when PVDC is used, with the embodiment illustrated in FIG. 8, the decoration piece comprises the design piece 3, a dye migration preventing film 151 made of PVDC and provided on the lower surface of the design piece 3, and the lower layer 7 provided on the lower surface of the dye migration preventing film 151. Since the dye migration preventing film 151 is made of PVDC, the dye migration preventing film 151 can prevent any dye migration. Also, since PVDC can be melted and cut by means of the high-frequency dielectric heating, the decoration piece in the embodiment shown in FIG. 8 can be prepared by the high-frequency dielectric heating. Furthermore, since PVDC can be fusion-bonded to the design piece 3 and the lower layer 7, there can be provided a decoration piece in which the respective elements are not separated from each other.

<Where EVOH or Polyamide MXD6 is Used>

EVOH and polyamide MXD6 are not fusion-bonded to the design piece 3 and the lower layer 7. Then, it will be described hereinafter how EVOH and polyamide MXD6 can be used for the dye migration preventing layer 5.

A first intermediate layer 41 that can be fusion-bonded to the design piece 3 is provided on the upper surface of a dye migration preventing film 51 made of EVOH or polyamide MXD6. A second intermediate layer 61 that can be fusion-bonded to the lower layer 7 is provided on the lower surface of the dye migration preventing film 51. The first intermediate layer 41, the dye migration preventing film 51 and the second intermediate layer 61 are arranged to form a laminated film. It has been found that this arrangement of the laminated film makes EVOH and polyamide MXD6 possible to use for forming the dye migration preventing layer.

For the first and second intermediate layers 41 and 61, for example, polyurethane film and urethane heat adhesion film may be used. Polyurethane film may be used for both the first and second intermediate layers 41 and 61. Alternatively, polyurethane film may be used for one of the first and second intermediate layers 41 and 61, and urethane heat adhesion film may be used for the other layer.

Figure 13:
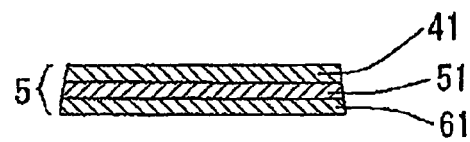
FIG. 13 is a schematic sectional view illustrating a dye migration preventing layer in a decoration piece according to a further embodiment of the invention.

As an example, one laminating process can be performed by means of co-extrusion of the first intermediate layer 41, the dye migration preventing film 51 made of EVOH or polyamide MXD6, and the second intermediate layer 61 (see the embodiments of FIGS. 13 and 14). It will be appreciated that FIG. 13 does not show the design piece 3 and the lower layer 7, but only the section of the dye migration preventing layer 5. FIG. 14 illustrates the section of the whole decoration piece (including the design piece 3 and the lower layer 7 together with the dye migration preventing layer 5), and also illustrates the section of the heat transfer type decoration piece to which the carrier film 33 and the release paper 7 are attached.

The co-extrusion may be performed in a conventional process. Since the melt resins are laminated and cooled, the first intermediate layer 41 and the dye migration preventing film 51 are adhered to each other, and the dye migration preventing film 51 and the second intermediate layer 61 are adhered to each other.

In another lamination process, a first adhesive 43 that can adhere to both the first intermediate layer 41 and the dye migration preventing film 51 is arranged between the first intermediate layer 41 and the dye migration preventing film 51, and a second adhesive 63 that can adhere to both the dye migration preventing film 51 and the second intermediate layer 61 is arranged between the dye migration preventing film 51 and the second intermediate layer 61, so that the first and second intermediate layers 41 and 61 and the dye migration preventing film 51 are firmly fixed to form the laminated film. See the embodiment shown in FIG. 15. It will be appreciated that FIG. 15 does not show the design piece 3 and the lower layer 7, but only the section of the dye migration preventing layer 5. In the embodiments illustrated in FIGS. 16-18, similarly, the first and second adhesives 43 and 63 are used. By using the first and second adhesives 43 and 63, the first intermediate layer 41 and the dye migration preventing film 51 can be firmly fixed, and the second intermediate layer 61 and the dye migration preventing film 51 can be firmly fixed.

For the first and second adhesives 43 and 63, for example, "TAKELAC A520" made by Mitsui Chemicals Co., Ltd. may be available.

In case of the dye migration preventing film 151 made of PVDC, there is used a dye migration preventing film having a thickness of about 40 micron. In case of the dye migration preventing film 51 made of EVOH or polyamide MXD6, there is used a dye migration preventing film having a thickness of about 12 micron, However, the present invention is not limited to such thickness. The thickness of the dye migration preventing films 51 and 151 may be suitably selected depending on an amount of the dye that is contained within the cloths or objects to be worn.

<Third Intermediate Layer>

As described above, PVDC may be fusion-bonded to the design piece 3 and the lower layer 7.

Even if the dye migration preventing layer is to be made of PVDC, a material may be arranged between the dye migration preventing film 151 and the design piece 3, and/or between the dye migration preventing film 151 and the lower layer 7. Such material can adhere the dye migration preventing film 151 and the design piece 3, and/or adhere the dye migration preventing film 151 and the lower layer 7, so as to more firmly fix these materials and so as not to separate them one another.

More particularly, a third intermediate layer 141 may be arranged between the design piece 3 and the dye migration preventing film 151, which third intermediate layer can fusion-bond the design piece 3 and the dye migration preventing film 151. In this way, it is possible to more firmly fix the design piece 3 and the dye migration preventing film 151. See the embodiment in FIG. 10. In the embodiment illustrated in FIGS. 9 and 12, similarly, the third intermediate layer 141 is provided.

For the third intermediate layer 141, if the design piece 3 is made of soft polyurethane urethane heat adhesion film, urethane thermal adhesion film (for example, #203 manufactured by Nihon Matai Co., Ltd., #3218, #3415 manufactured by Benis Co., Ltd. in U.S.A., and so on) By arranging the heat adhesion film between the design piece 3 and the dye migration preventing film 151 when the decoration piece is prepared, the heat adhesion film is firmly fixed to the design piece 3 and the dye migration preventing film 151 by means of the high-frequency dielectric heating.

<Fourth Intermediate Layer>

A fourth intermediate layer 161 may be arranged between the dye migration preventing film 151 and the lower layer 7, which fourth intermediate layer 161 can be fusion-bonded to both the dye migration preventing film 151 and the lower layer 7. In this way, it is possible to more firmly fix the dye migration preventing film 151 and the lower layer 7 each other. See the embodiment in FIG. 11. In the embodiments illustrated in FIGS. 9 and 12, similarly, the fourth intermediate layer 161 is arranged.

For the fourth intermediate layer 161, if the lower layer 7 is polyester cloth, an urethane heat adhesion film similar to the third intermediate layer may be used, for example.

Furthermore, both the third intermediate layer 141 and the fourth intermediate layer 161 may be arranged to firmly adhere the decoration piece as a whole. See the embodiments in FIGS. 12 and 9. In the embodiment illustrated in FIG. 12, there is shown only the section of the dye migration preventing layer 5. FIG. 9 illustrates the section of the decoration piece as a whole (including the design piece 3 and the lower layer 7 together with the dye migration preventing layer 5) and also illustrates the section of the heat transfer type decoration piece to which the carrier film 33 and the release paper 7 are attached.

<Second Metal Deposition Layer>

When the first intermediate layer 41 and the second intermediate layer are adhered with the first adhesive 43 and the second adhesive 63, respectively, a second metal deposition layer may be provided.

Figure 16:
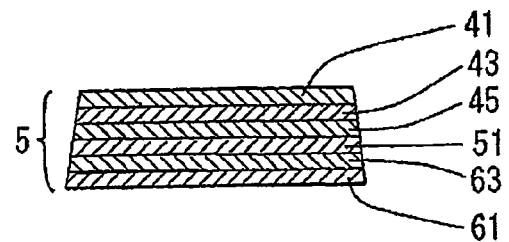
FIG. 16 is a schematic sectional view illustrating a dye migration preventing layer in a decoration piece having a second metal vapor deposition layer according to a further embodiment of the invention.
Figure 17:
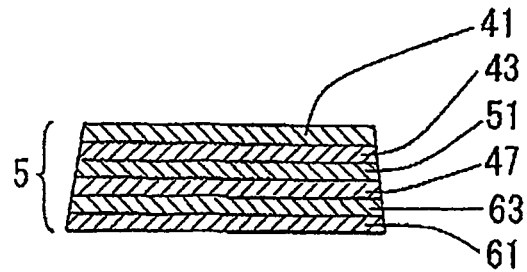
FIG. 17 is a schematic sectional view illustrating a dye migration preventing layer in a decoration piece having a second metal vapor deposition layer according to a further embodiment of the invention.

More particularly, a metal deposition layer 45 may be provided on the upper surface of the dye migration preventing film 51 (FIG. 16), and a metal deposition layer 47 may be provided on the lower surface of the dye migration preventing film 51 (FIG. 17).

Metals in the second metal deposition layers 45 and 47 make it possible to more effectively block a sublimation of the dye, which means that the effect of the dye migration prevention is more increased. If the design piece 3 is transparent, with the provision of the second metal deposition layer 45 or 47, a metallic luster may be given to the design or pattern (the design layer becomes metallic).

As in the first metal deposition layer, the used second metal deposition layer 45 or 47 may be a conventional one that is used as a metal deposition layer in the art.

The presence of the second deposition layer (s) 45, 47 has no influence on the strength of the whole decoration piece, because the second deposition layers 45 and 47 are firmly fixed by the first adhesive 43 and the second adhesive 63, respectively.

<Third Metal Deposition Layer>

A third metal deposition layer may be provided on the upper surface of the dye migration preventing layer 5. More particularly, a soft polyurethane film 48 having a third metal deposition layer 49 may be provided on the upper surface of the first intermediate layer 41, and may be adhered to the upper surface of the first intermediate layer 41 by the third adhesive 46. See FIG. 18.

Since the third metal deposition layer 49 is provided on the upper surface of the first intermediate layer 41, if the design piece 3 is transparent then a metallic luster may be given to the design or pattern.

As described in the above, the dye migration preventing layer 5 may comprise:

(A) a laminated film (FIGS. 13 and 14) that is produced by a co-extrusion of the dye migration preventing film 51, the first intermediate layer 41 arranged on the upper surface of the dye migration preventing film 51, and the second intermediate layer 61 arranged on the lower surface of the dye migration preventing film 51, when the dye migration preventing film 51 is made of EVOH or polyamide MXD6; or (B) a laminated film (FIG. 15) that includes the dye migration preventing film 51, the first intermediate layer 41 adhered to the upper surface of the dye migration preventing film 51 with the first adhesive 43, and the second intermediate layer 61 adhered to the lower surface of the dye migration preventing film 51 with the second adhesive 63, when the dye migration preventing film 51 is made of EVOH or polyamide MXD6; or (C) only the dye migration preventing layer 151 (FIG. 8), when the dye migration preventing layer 151 is made of PVDC; or (D) the dye migration preventing layer 151, and the third intermediate layer 141 arranged on the upper surface of the dye migration preventing layer 151 (FIGS. 9 and 10), when the dye migration preventing layer 151 is made of PVDC; or (E) the dye migration preventing layer 151, and the fourth intermediate layer 161 arranged on the lower surface of the dye migration preventing layer 151 (FIG. 11), when the dye migration preventing layer 151 is made of PVDC; or (F) the dye migration preventing layer 151, the third intermediate layer 141 arranged on the upper surface of the dye migration preventing layer 151, and the fourth intermediate layer 161 arranged on the lower surface of the dye migration preventing layer 151 (FIG. 12), when the dye migration preventing layer 151 is made of PVDC.

(G) Or it may further comprises the second metal deposition layer (FIGS. 16 and 17).

Figure 18:
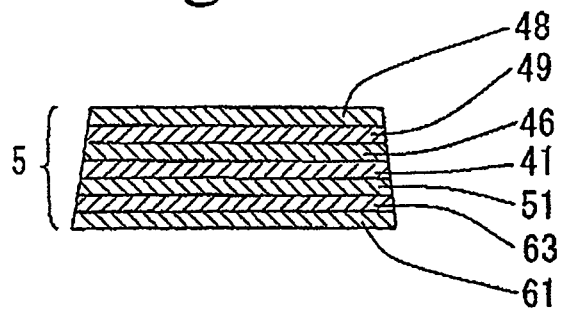
FIG. 18 is a schematic sectional view illustrating a dye migration preventing layer in a decoration piece having a third metal deposition layer according to a further embodiment of the invention.
Figure 19:
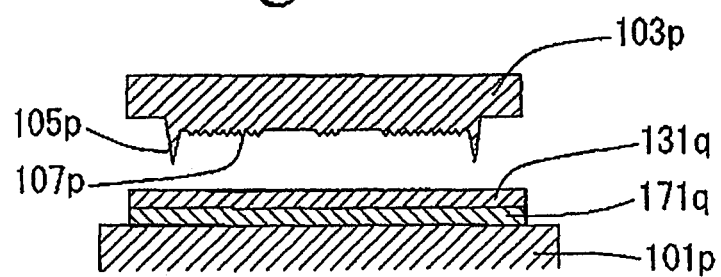
FIG. 19 is a schematic sectional view illustrating the process for preparing a decoration piece in accordance with a prior art, in which respective elements of material are disposed on a mold table.
Figure 20:
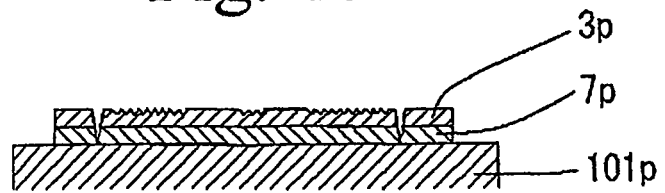
FIG. 20 is a schematic sectional view illustrating the process for preparing a decoration piece in accordance with a prior art after a high-frequency dielectric heating step, a design piece forming step by a pressing blade and a melting and cutting step by a fusion cutter are performed.
Figure 21:
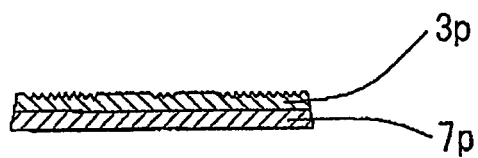
FIG. 21 is a schematic sectional view illustrating the preparing process for a decoration piece prepared in accordance with a prior art.

(H) Or it may further comprises the third metal deposition layer (FIG. 18).

<Preparing Method>

FIGS. 1-4 schematically illustrate a method of preparing a decoration piece according to the present invention that is a heat transfer type decoration piece. In the method illustrated in FIGS. 1-4, the lower layer is molten and cut by means of the high-frequency dielectric heating, that is, such method is used when the lower layer is made of the heat adhesion film (or the design piece is a heat transfer type piece).

Material 7a of the lower layer 7 is arranged on a mold table 101. Material 5a of the dye migration preventing layer 5 is arranged on the lower layer material 7a, and material 3a of the design piece 3 is arranged on the material 5a.

In this connection, the dye migration preventing layer material 5a comprises a laminated film produced by co-extruding materials for the first intermediate layer 41, the dye migration preventing film 51 and the second intermediate layer 61, for example, in the embodiment shown in FIG. 13. In the embodiment shown in FIG. 15, the dye migration preventing layer material 5a comprises a laminated film in which the first intermediate layer 41 and the second intermediate layer 61 are previously adhered to the material of the dye migration preventing film 51 by the first adhesive 43 and the second adhesive 63, respectively. In the case of FIGS. 16-18, similarly, the dye migration preventing layer material 5a comprises a laminated film that is produced by adhering the respective component materials to each other.

Figure 11:
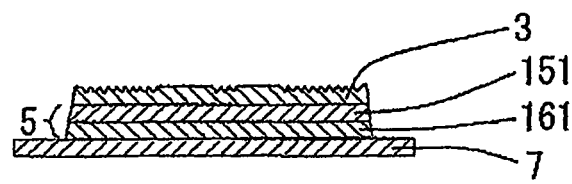
FIG. 11 is a schematic sectional view illustrating a decoration piece according to a further embodiment of the invention, in which a lower layer comprises a cloth.
Figure 12:
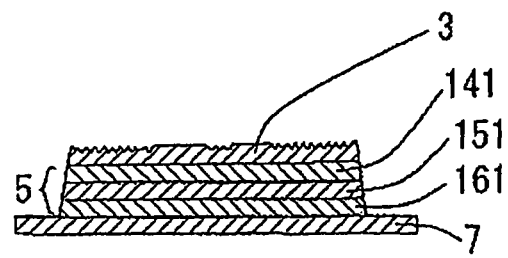
FIG. 12 is a schematic sectional view illustrating a decoration piece according to a further embodiment of the invention, in which a lower layer comprises a cloth.

In the decoration piece according to the embodiment illustrated in FIG. 8, the dye migration preventing layer material 5a comprises PVDC film that forms the dye migration preventing film 151. In the decoration piece according to the embodiment illustrated in FIG. 10, a film that forms the third intermediate layer 141 is arranged on the PVDC film that forms the dye migration preventing film 151. In the case of FIGS. 11-12, similarly, the dye migration preventing layer material 5a is produced by superposing the respective component materials to each other.

Then, the materials on the table are pressed or forced by means of an engraving dye 103 and heated by the high frequency dielectric heating. Where the engraving dye 103 is provided with a pressing blade 107 as in illustrated embodiment, a design or pattern is formed on material 3a for the design piece by the pressing blade 107. The pressing blade 107 may be provided if necessary, but not essential. Then the design piece material 3a, the dye migration preventing layer Material 5a and the lower layer material 7a are melted and cut by means of the fusion cutter 105.

Figure 2:
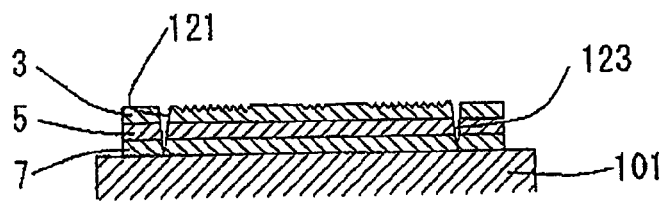
FIG. 2 is a schematic sectional view illustrating the process of the first method for preparing a decoration piece according to the invention after a high-frequency dielectric heating step, a design piece forming step by a pressing blade and a melting and cutting step by a fusion cutter are performed.

As shown in FIG. 2, an outer profile line 121 of the design piece 3 and an outer profile line 123 of the dye migration preventing layer 5 are formed by this melting and cutting operation. The outer profile line 123 of the dye migration preventing layer 5 has a shape and size that are substantially identical to ones of the outer profile line 121 of the design piece 3. This means that the dye migration preventing layer 5 is not conspicuous, and does not affect the design of the design piece. In the preparing method of FIGS. 1-4, the lower layer 7 is also melted and cut.

By the high-frequency dielectric heating, the design piece 3 is fusion-bonded to the dye migration preventing layer 5 each other, and the dye migration preventing layer 5 is fusion-bonded to the lower layer 7 each other.

Figure 3:
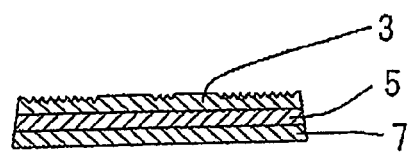
FIG. 3 is a schematic sectional view illustrating the process of the first method for preparing a decoration piece according to the invention, in which useless portions are removed.

Then as shown in FIG. 3, useless portions out of the outer profile lines are removed.

An assembly shown in FIG. 3 may be used as a design piece. With the preparing method shown in FIGS. 1-4, however, the carrier film 33 may be tackily bonded to the upper surface of the design piece 3 by a conventional tacky adhesive, and the release paper 75 may be applied to the lower surface of the lower layer 7.

In the preparing method illustrated in FIGS. 1-4, after the high-frequency dielectric heating step, the carrier film 33 is applied on the design piece 3. Alternatively, the carrier film 33 may be applied on the upper surface of the design piece material 3a shown in FIG. 1. In this case, the carrier film 33 is made of material that has a melting point higher than that of the design piece material 3a, so that the carrier film 33 is not melted and cut by the high frequency dielectric heating. In this way if the carrier film 33 is applied on the upper surface of the design piece material 3a before the high-frequency dielectric heating step, then it is possible to retain the relative positions of design forming members (for example, a plurality of characters) which are not integrated but the relative positions are important.

Figure 5:
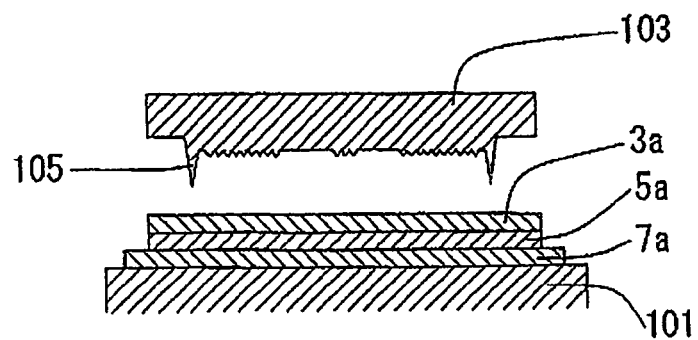
FIG. 5 is a schematic sectional view illustrating the process of the second method for preparing a decoration piece according to the invention, in which respective elements of material are disposed on a mold table.
Figure 6:
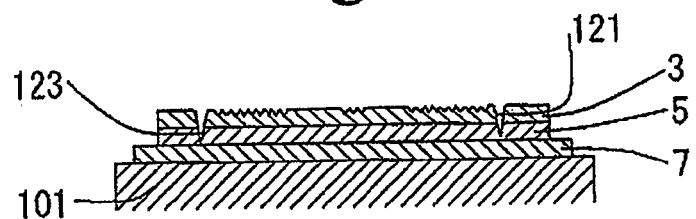
FIG. 6 is a schematic sectional view illustrating the process of the second method for preparing a decoration piece according to the invention after a melting and cutting step by a fusion cutter is performed.
Figure 7:
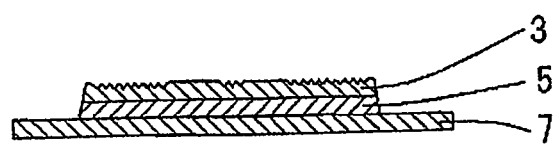
FIG. 7 is a schematic sectional view illustrating the process of the second method for preparing a decoration piece according to the invention, in which useless portions are removed.

FIGS. 5-7 illustrate a second preparing method of the decoration piece according to the present invention. The procedures of the second preparing method is the same as that of first preparing method of FIGS. 1-4 excepting that the lower layer material 7a is not melted and cut. The explanation about the same procedures is omitted. In the second method, the lower layer 7 may be made of polyester cloth for example, and thus there is provided a decoration piece in which a design or pattern is formed on the cloth of a sticker or the like.

As shown in FIG. 5, the lower layer material 7a, the dye migration preventing layer material 5a and the design piece material 3a are in sequentially arranged on the mold table 101, and then the high-frequency dielectric heating is performed. In the second method, the lower layer material 7a is not melted and cut by fusion cutter during the high-frequency dielectric heating step, as shown in FIG. 6.

In case of a sticker or the like, generally the carrier film 33 and the release paper 75 are not provided, and consequently the step corresponding to FIG. 4 is omitted.

<Experiment>

In accordance with the method shown in FIGS. 1-4, a decoration piece comprising a soft polyurethane film 31, a dye migration preventing layer 5 of a dye migration preventing film 151 made of PVDC, a lower layer 7 of a heat adhesion film, a carrier film 33 and a release paper 75 was prepared. While, a decoration piece for a comparison was prepared by the same materials and method illustrated in FIGS. 1-4 expecting that the dye migration preventing layer 5 was not used.

In accordance with the method shown in FIGS. 5-7, a decoration piece comprising a soft polyurethane film 31, a dye migration preventing layer 5 of a dye migration preventing film 151 made of PVDC, a lower layer 7 of a polyester cloth was prepared. While, a decoration piece for a comparison was prepared by the same materials and method illustrated in FIGS. 5-7 in which no dye migration preventing layer 5 is provided.

Further, in accordance with the embodiments shown in FIGS. 11 and 12, a decoration piece according to present invention and a comparative decoration piece were prepared.

In accordance with the method shown in FIGS. 1-4 there was prepared a decoration piece that comprises a soft polyurethane film 31, a dye migration preventing layer 5, a lower layer 7 of a heat adhesion film, a carrier film 33, and a release paper 75, said dye migration preventing layer 5 comprising a first intermediate layer 41 made of a polyurethane film, a dye migration preventing film 51 made of EVOH and a second intermediate layer 61 of a polyurethane film. A comparative decoration piece was also prepared by the same materials and method expecting that the dye migration preventing layer 5 was not used.

In accordance with the method shown in FIGS. 5-7, further, there was prepared a decoration piece that comprises a soft polyurethane film 31, a dye migration preventing layer 5, and a lower layer 7 of a polyester cloth, said dye migration preventing layer 5 comprising a first intermediate layer 41 made of a polyurethane film, a dye migration preventing film 51 made of EVOH and a second intermediate layer 61 of a polyurethane film. A decoration piece for a comparison was also prepared by the same materials and method in which the dye migration preventing layer 5 was not used.

These decoration pieces prepared in the above described way were attached to textures of uniforms for an association football dyed by a sublimation printing that is capable of easily occurring dye migration. The decoration pieces attached to textures were heated at 120 degrees centigrade for 90 minute. From the observation about a dye migration condition, no color migration of dye to the design pieces was found in the decoration pieces according to the present invention, but color migration of dye was found in the comparative decoration pieces. Consequently, it was found that the decoration pieces according to the present invention could be prevented from any dye migrating.

Also it has been appreciated that the decoration pieces of the present invention and the comparative ones did not cause any separation among the design piece 3, the dye migration preventing layer 5 and the lower layer 7, and therefore a strong decoration piece could be obtained even if the dye migration preventing layer was arranged.

The invention claimed is:
1. A decoration piece comprising:
a design piece made of thermoplastic soft polyurethane formed with a design and having an outer profile line;
a lower layer; and
a dye migration preventing layer arranged between the design piece and the lower layer, said dye migration preventing layer having an outer profile same as that of said design piece, said dye migration preventing layer capable of being fusion-bonded to both said design piece and the lower layer, said dye migration preventing layer capable of preventing any migrating of dye, wherein
said dye migration preventing layer is a laminated film comprising
a dye migration preventing film made of ethylene-vinyl alcohol copolymer or polyamide MXD6,
a first intermediate layer co-extruded with the dye migration preventing film, said first intermediate layer being arranged between said dye migration preventing film and said design piece, said first intermediate layer capable of fusion-bonded to said design piece, and
a second intermediate layer co-extruded with the dye migration preventing film, said second intermediate layer being arranged between said dye migration preventing film and said lower layer, said second intermediate layer capable of fusion-bonded to said lower layer.
2. The decoration piece according to claim 1, wherein said first intermediate layer is made of soft polyurethane film, and said second intermediate layer is made of soft polyurethane film.

3. The decoration piece according to claim 1, wherein one of said first and second intermediate layers is made of soft polyurethane film, and the other film is made of urethane thermal adhesion film.

4. A decoration piece comprising:
a design piece made of thermoplastic soft polyurethane formed with a design and having an outer profile line;
a lower layer; and
a dye migration preventing layer arranged between the design piece and the lower layer, said dye migration preventing layer having an outer profile same as that of said design piece, said dye migration preventing layer capable of being fusion-bonded to both said design piece and the lower layer, said dye migration preventing layer capable of preventing any migrating of dye, wherein
said dye migration preventing layer is a laminated film comprising
a dye migration preventing film made of ethylene-vinyl alcohol copolymer or polyamide MXD6,
a first intermediate layer adhered to the dye migration preventing film by a first adhesive, said first intermediate layer being arranged between said dye migration preventing film and said design piece, said first intermediate layer capable of fusion-bonded to said design piece, and
a second intermediate layer adhered to the dye migration preventing film by a second adhesive, said second intermediate layer being arranged between said dye migration preventing film and said lower layer, said second intermediate layer capable of being fusion-bonded to said lower layer.

5. The decoration piece according to claim 4, wherein a metal vapor deposition layer is arranged on one of an upper and lower surfaces of said dye migration preventing film.

6. The decoration piece according to claim 4, wherein a metal vapor deposition surface of a soft polyurethane metal vapor deposition film is adhered to an upper surface of said first intermediate layer by a third adhesive.

7. A decoration piece comprising:
a design piece made of thermoplastic soft polyurethane formed with a design and having an outer profile line;
a lower layer; and
a dye migration preventing layer arranged between the design piece and the lower layer, said dye migration preventing layer having an outer profile same as that of said design piece, said dye migration preventing layer capable of being fusion-bonded to both said design piece and the lower layer, said dye migration preventing layer capable of preventing any migrating of dye, wherein
said dye migration preventing layer comprises a dye migration preventing film made of polyvinylidene chloride.

8. The decoration piece according to claim 7, wherein said dye migration preventing layer comprises said dye migration preventing film, and a third intermediate layer arranged between said dye migration preventing film and said design piece, said third intermediate layer capable of being fusion-bonded to both said dye migration preventing film and said design piece.

9. The decoration piece according to claim 7, wherein said dye migration preventing layer comprises said dye migration preventing film, and a fourth intermediate layer arranged between said dye migration preventing film and said lower layer, said fourth intermediate layer capable of being fusion-bonded to both of said dye migration preventing film and said lower layer.

10. The decoration piece according to claim 9, wherein said third intermediate layer and/or said fourth intermediate layer is made of urethane thermal adhesion film.

11. The decoration piece according to claim 7, wherein said dye migration preventing layer comprises
said dye migration preventing film,
a third intermediate layer arranged between said dye migration preventing film and said design piece, said third intermediate layer capable of being fusion-bonded to both said dye migration preventing film and said design piece, and
a fourth intermediate layer arranged between said dye migration preventing film and said lower layer, said fourth intermediate layer capable of being fusion-bonded to both of said dye migration preventing film and said lower layer.

* * * * *